United States Patent [19]

Bragg et al.

[11] 3,716,901
[45] Feb. 20, 1973

[54] METHOD FOR MAKING A TORSIONAL VIBRATION DAMPER

[75] Inventors: Gary O. Bragg; Russel F. Bahr; Shellie O. Williamson, all of Peoria, Ill.

[73] Assignee: Caterpillar Tractor Co., Peoria, Ill.

[22] Filed: May 24, 1971

[21] Appl. No.: 146,257

[52] U.S. Cl............29/149.5 NM, 29/436, 29/527.4
[51] Int. Cl. ....B21d 53/10, B23p 19/00, B23p 17/00
[58] Field of Search........29/434, 436, 421, 451, 450, 29/527.4, 149.5 NM

[56] References Cited

UNITED STATES PATENTS 3,200,485  8/1965  McGavern, Jr..........................29/421

*Primary Examiner*—Thomas H. Eager
*Attorney*—Charles M. Fryer et al.

[57] ABSTRACT

A fluidized bed coating method is used to cover the weight of a torsional vibration damper with a thin coating of a bearing material, such as nylon. Thereafter, the weight is rotatably mounted in a housing which is filled with a viscous damping fluid.

5 Claims, 6 Drawing Figures

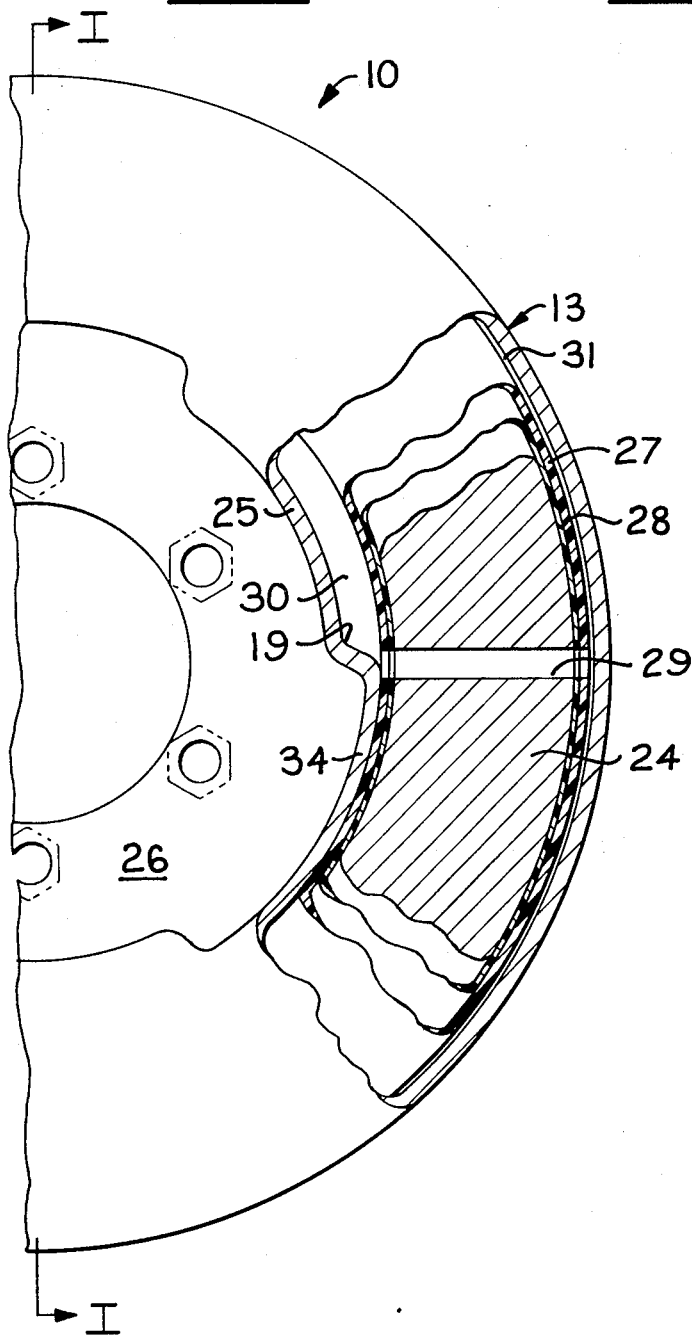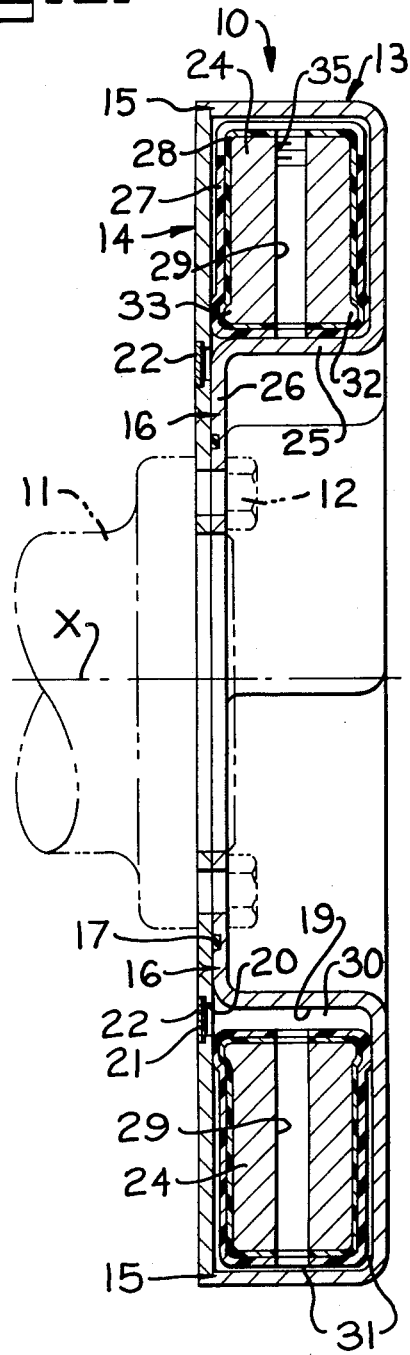

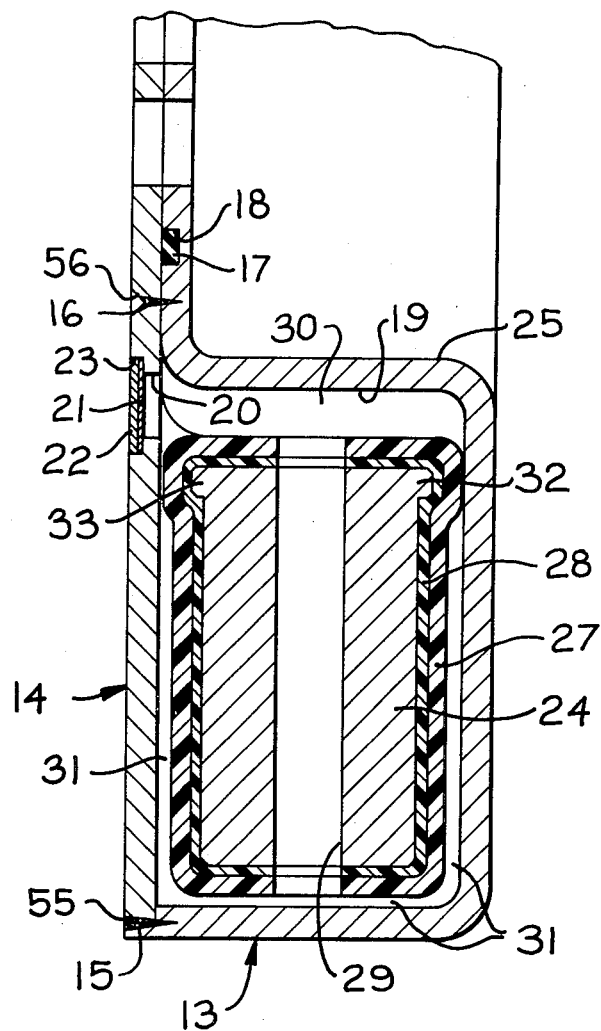

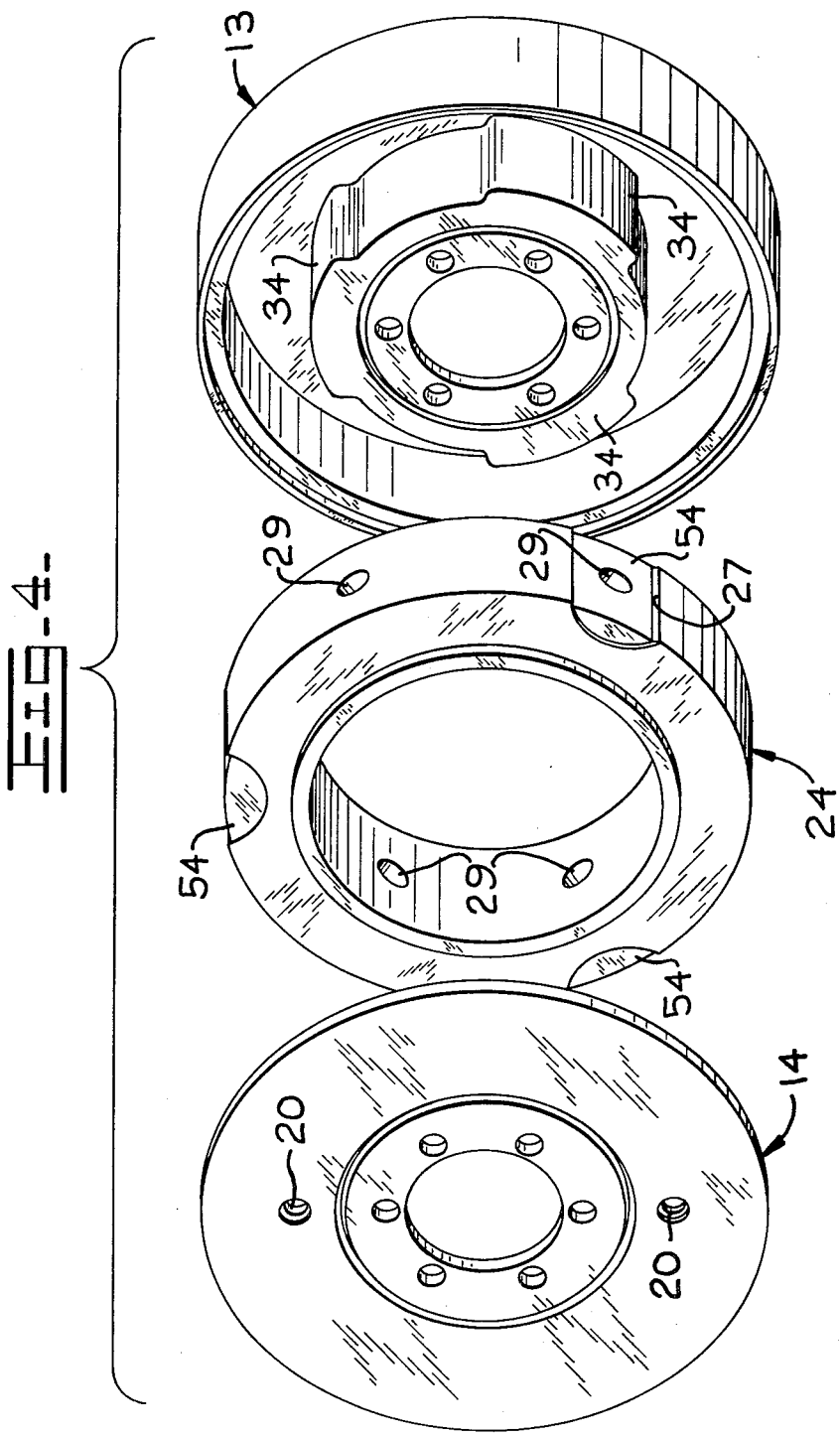

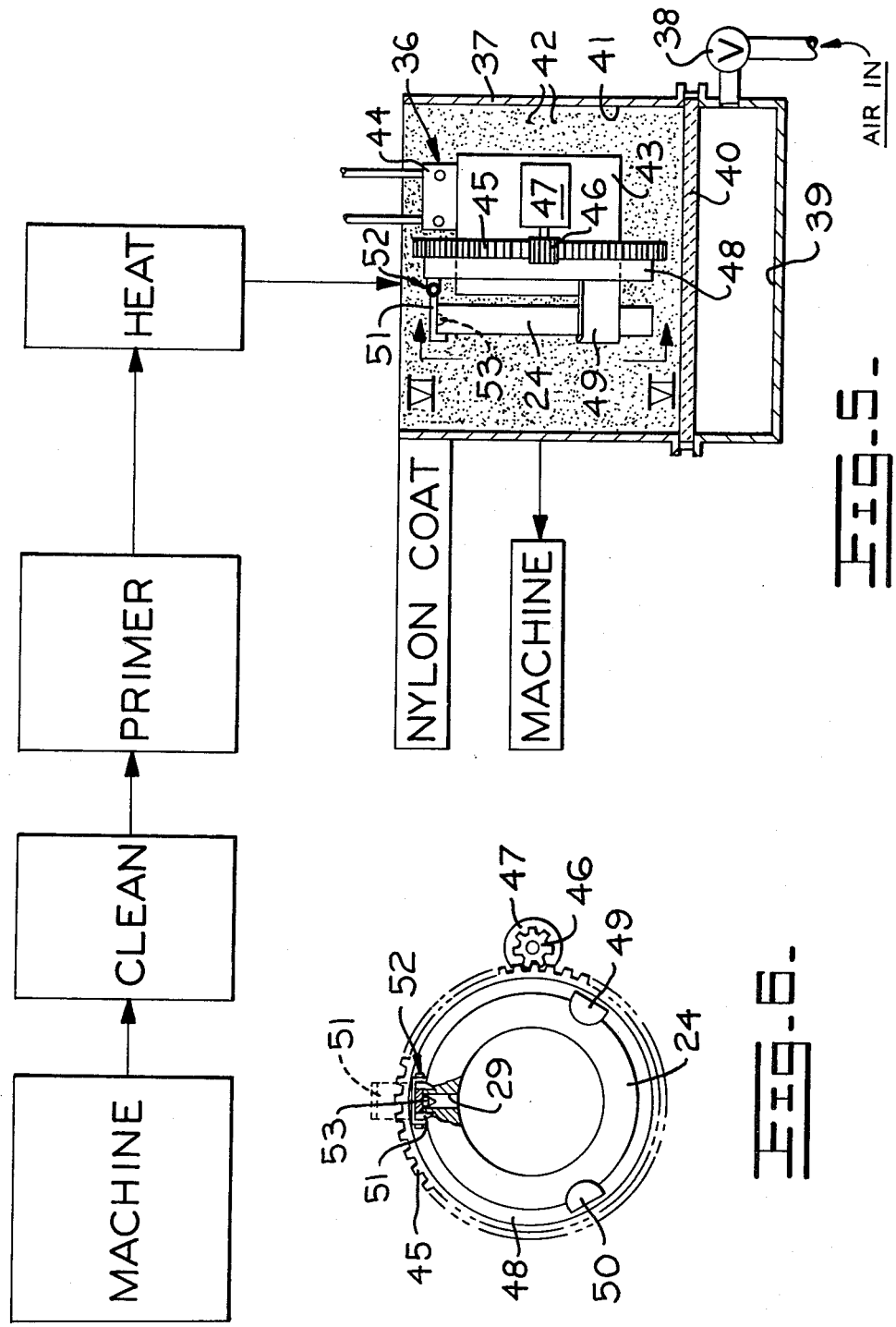

3,716,901

METHOD FOR MAKING A TORSIONAL VIBRATION DAMPER

BACKGROUND OF THE INVENTION

A torsional vibration damper may be attached to the crankshaft of an internal combustion engine to dampen vibrations occasioned during operation thereof. A bearing is normally secured to the housing or weight of the damper to permit the housing and weight to rotate relative to each other. The fabrication of such bearings is normally laborious and requires a high degree of quality control thereover.

SUMMARY AND OBJECTS OF THIS INVENTION

An object of this invention is to provide a non-complex and economical method for making a torsional vibration damper of the above type economically and expeditiously while yet assuring a high degree of quality control thereover.

The method for making the damper comprises a fluidized bed coating step for substantially coating the weight with a layer of a bearing material, such as nylon. During such method step the weight is preferably clamped in a fixture and rotated to assure a substantially uniform distribution of the plastic material thereon.

DESCRIPTION OF THE DRAWINGS

Other objects of this invention will become apparent from the following description and accompanying drawings wherein:

FIG. 1 is a cross-sectional view of a torsional vibration damper embodying the present invention, taken in the direction of arrows I—I in FIG. 2;

FIG. 2 is a partially sectioned, side elevational view of a portion of the damper;

FIG. 3 is an enlarged sectional view of the lower portion of the damper as illustrated in FIG. 1;

FIG. 4 is an exploded isometric view of major components employed in the damper;

FIG. 5 is a schematic flow diagram illustrating steps employed in a method for fabricating an annular weight employed in the damper; and FIG. 6 is a view taken in the direction of arrows VI—VI in FIG. 5.

DESCRIPTION OF THE PREFERRED EMBODIMENT

The FIGS. 1-4 damper is disposed on a central rotational axis X and comprises an integrated hub and housing assembly 10 adapted to be attached to a crankshaft 11 of an internal combustion engine by circumferentially spaced bolts 12. The housing assembly comprises an annular case 13 and circular, flat plate portion 14 secured together by annular electron-beam welds 15 and 16. The case and plate may each comprise a cold rolled SAE 1008, aluminum killed steel, for example, which is particularly adapted for electron-beam welding.

An annular O-ring seal 17 is positioned in a mating groove 18 formed on case 13 (FIG. 3). A closed annular chamber 19 contains a highly viscous (e.g., 1 million centistokes) silicone fluid. The chamber is filled via one of the ports 20 and the ports are thereafter closed by means of a lead seal 21 and overlying expansion plug 22 mounted in a counterbore 23. The second port is utilized for air purging purposes during the filling operation.

An annular inertia weight 24 is rotatably mounted in a closed chamber, defined by the opposed sidewalls and inner and outer walls of the housing, to cooperate with the surrounding silicone fluid to provide the damping and tuning desiderata. The weight is rotatably mounted on an axially disposed hub or inner wall 25 attached to a radially disposed flange 26 attached to crankshaft 11. The weight may comprise an iron casting or other weighty material substantially covered with a plastic bearing material or coating 27, such as nylon, Teflon or bronze having uniform thickness approximating 0.015 in., secured on a conventional primer 28, such as a 253-P primer manufactured by the M & T Chemical Co., as will be hereinafter more fully described. In addition to the bearing contact provided the plastic material prevents contact between the metallic weight and housing.

A plurality of radial passages 29 are formed through the weight and coating 27 to communicate the viscous fluid from chamber portions 30 to clearances 31, defined between the weight and the sidewalls and outer wall of the housing. The clearances are precisely defined and maintained during damper operation by means of axially aligned annular shoulders or spacing means 32 and 33, formed at the radially inner portion of the weight. Chamber portions 30, similar to those described in U.S. Pat. No. 3,512,612, normally retain a substantially large portion of the silicone fluid and are pre-fabricated in the form of recesses defined by circumferentially spaced and raised surface portions 34 formed on hub 25 of the housing.

Referring to FIGS. 5 and 6, inertia weight 24 is first suitably cast and machined, including the drilling of radial passages 29. One of the passages is preferably tapped at the radially outer end thereof, as shown at 35 in FIG. 1, to provide threads adapted to have an eye bolt secured therein for transport purposes. The exposed surfaces of the weight are then cleaned by subjecting them to grit blasting or the like.

The weight is then coated with a standard primer 28, preferably approximating .002 in. in thickness, by dipping it into a primer containing tank, for example. The weight is then placed in an oven wherein it is heated to a temperature preferably in the range of from 450° F. to 550° F. The heated weight is removed from the oven and mounted on a fixture 36 for application of nylon coating 27 thereon. The fixture is selectively lowered into a tank 37 of a fluidized bed coating apparatus of the type disclosed in U.S. Pat. No. 2,974,059.

In general, the fluidized bed coating process comprises the steps of discharging a pressurized gas, such as air or nitrogen, through a control valve 38 and into a lower chamber 39. The gas passes upwardly through a porous ceramic plate means 40 and into an upper chamber 41 to suspend powdered nylon particles 42 therein. The powdered nylon is uniformly suspended in a continuously fluidized bed which contacts the heated surface portions of weight 24 to coat same. It should be noted that the pores formed through plate 40 are suitably sized to permit the air to move upwardly, but to prevent the nylon powder from descending therethrough.

Fixture 36 comprises a support 43 adapted to be moved vertically by a conventional hoist mechanism 44. A bull gear 45 is rotatably mounted on the support to engage with a pinion gear 46 adapted to be selectively driven by an air motor 47. A support means 48 is secured to the bull gear and has three circumferentially spaced brackets or mounting means 49, 50 and 51 attached thereto. The brackets may be magnetized to further assure precise and positive mounting of the weight on the fixture.

Lower brackets 49 and 50 are fixedly secured to the support whereas bracket 51 is hingedly connected at 52 thereon for selectively mounting the weight on the fixture. The latter bracket has tapered pin 53 secured thereto for engaging the upper passage 29 for centering and securance purposes. In FIG. 6, bracket 51 is further shown in a dotted line or raised position which facilitates removal of the inertia weight from the fixture when it is raised out of chamber 41 by means of hoist mechanism 44. As shown in FIG. 4, portions of the brackets function as "masks" to prevent adherence of the nylon coating to portions 54 of the weight to provide gauge means for subsequent machining operations.

In particular, the dimensional tolerances of the weight must be held very close for correct installation in the damper's housing. Since the nylon coating will initially exhibit a somewhat non-uniform thickness, cutout portions 54 may be used for precise, three-point chucking purposes to achieve close machining tolerances. Dimensional integrity, including a substantially even thickness of the nylon coating on the weight, are thus assured.

Upon removal of the coated weight from fixture 36 and subsequent machining thereof, the weight is centered on raised portions 34 of the housing and O-ring seal 17 is seated in groove 18 (FIGS. 1 and 3). Plate 14 is then secured to case 13 by electron-beam welds 15 and 16. The plate preferably has conically shaped, annular grooves 55 and 56 formed thereon to assure the desired penetration of welds 15 and 16 through the plate and into the case. In addition, the welds will not protrude beyond the outer surface of the plate which might inhibit correct assembly of a drive pulley or the like thereon. Also, the welding operator is provided with an accurate line or template on which to weld.

Chamber 19, including chamber portions 30, is thereafter filled with a viscous fluid via one of the ports 20. The second port permits air to escape during the filling operation wherein the damper is maintained horizontally. When the chamber has received the proper amount of fluid, lead seals 21 are placed within counterbores 23 of ports 20 (FIG. 3) and locked in place by means of expansion plugs 22.

What is claimed is:

1. In a method for making a torsional vibration damper, the steps comprising
    forming a metallic annular weight,
    heating said weight,
    exposing said heated weight to a continuously fluidized bed containing fine particles of a bearing material suspended therein, and
    coating said weight with said bearing material.

2. The invention of claim 1 further comprising the step of simultaneously rotating said weight about a central, rotational axis thereof during said coating step.

3. The invention of claim 1 further comprising the step of masking peripheral surface portions of said weight during said coating step to prevent adherence of said bearing material thereat.

4. The invention of claim 1 further comprising the step of rotatably mounting said weight in a closed annular chamber defined in a housing and at least substantially filling said chamber with a viscous damping fluid.

5. The method of claim 1 wherein said coating step comprises coating said weight with nylon.

* * * * *